US012248534B2

(12) United States Patent
Bouadi et al.

(10) Patent No.: US 12,248,534 B2
(45) Date of Patent: Mar. 11, 2025

(54) AUTOMATED FEATURE ENGINEERING FOR PREDICTIVE MODELING USING DEEP REINFORCEMENT LEARNING

(71) Applicant: SAP SE, Walldorf (DE)

(72) Inventors: Mohamed Bouadi, La Garenne-Colombes (FR); Arta Alavi, Andresy (FR)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 17/694,288

(22) Filed: Mar. 14, 2022

(65) Prior Publication Data
US 2023/0195842 A1    Jun. 22, 2023

Related U.S. Application Data

(60) Provisional application No. 63/291,789, filed on Dec. 20, 2021.

(51) Int. Cl.
*G06N 3/08* (2023.01)
*G06F 18/21* (2023.01)
(Continued)

(52) U.S. Cl.
CPC .......... *G06F 18/217* (2023.01); *G06F 18/214* (2023.01); *G06N 3/08* (2013.01)

(58) Field of Classification Search
CPC ....... G06F 18/217; G06F 18/214; G06N 3/08; G06N 3/092; G06N 7/01; G06N 20/00; G06N 3/006; G06N 3/084; G06N 5/04
See application file for complete search history.

(56) References Cited

U.S. PATENT DOCUMENTS

2018/0150758 A1* 5/2018 Niininen ............... H04L 41/147
2020/0380417 A1* 12/2020 Briancon .......... G06Q 10/06393
(Continued)

FOREIGN PATENT DOCUMENTS

CA         3135226 A1 * 11/2020 ............. G06F 17/18
WO    WO-2020011068 A1 *  1/2020 ............. G06N 20/00
(Continued)

OTHER PUBLICATIONS

Khurana, Udayan et al., "Ensembles with Automated Feature Engineering", Jul. 15, 2018 (Jul. 15, 2018), XP055606400, Retrieved from the Internet: URL:https://udayankhurana.com/wp-content/uploads/2018/08/58.pdf, [retrieved on Jul. 17, 2019], 9pgs (Year: 2019).*

(Continued)

*Primary Examiner* — Asghar H Bilgrami
(74) *Attorney, Agent, or Firm* — Buckley, Maschoff & Talwalkar LLC

(57) ABSTRACT

Systems, methods, and computer-readable media for performing feature engineering on a dataset for predictive modeling are disclosed. A dataset may comprise a plurality of features that are used for the predictive model. The dataset may be fed to a neural network to determine which features have the greatest impact on the predictive model and which features do not positively impact the predictive model. A deep reinforcement learning agent may select an action to perform on the dataset. The action may be applied to the dataset to generate new features and obtain a transformed dataset. Features that do not positively impact the predictive model may be removed from the dataset. A reward may be calculated for the transformed dataset. The transformed dataset and the reward may be passed to the neural network for further iteration and optimization of the features for the predictive model.

18 Claims, 5 Drawing Sheets

(51) Int. Cl.
    *G06F 18/214*     (2023.01)
    *G06N 3/006*     (2023.01)
    *G06N 3/084*     (2023.01)
    *G06N 3/092*     (2023.01)
    *G06N 5/04*     (2023.01)
    *G06N 7/01*     (2023.01)
    *G06N 20/00*     (2019.01)

(56) References Cited

U.S. PATENT DOCUMENTS

| | | | | |
|---|---|---|---|---|
| 2021/0110219 | A1* | 4/2021 | Ouellet | G06F 18/22 |
| 2021/0192524 | A1* | 6/2021 | Saleh | G06Q 20/4016 |
| 2021/0241309 | A1* | 8/2021 | Wolf, Jr. | G06N 5/04 |
| 2021/0245005 | A1* | 8/2021 | Pao | A63B 24/0006 |
| 2023/0153766 | A1* | 5/2023 | Thoele | G06Q 40/08 |
| | | | | 705/4 |

FOREIGN PATENT DOCUMENTS

| | | | | |
|---|---|---|---|---|
| WO | WO-2021197782 | A1 * | 10/2021 | G05B 23/024 |
| WO | 2022/056033 | A1 | 3/2022 | |

OTHER PUBLICATIONS

Khurana, Udayan et al., "Feature Engineering for Predictive Modeling using Reinforcement Learning". arX1V:1709.07150v1 [cs.A1], Cornell Universicity Library, Sep. 21, 2017 (Sep. 21, 2017), XP080822280, 8pgs. (Year: 2017).*

Stadie, Bradly C et al., "Incentivizing Exploration In Reinforcement Learning With Deep Predictive Models", arXiv: 1507.00814v3, Nov. 19, 2015 (Nov. 19, 2015), XP055395591, Retrieved from the Internet: URL:https://arxiv.org/abs/1507.00814v3, [retrieved on Aug. 2, 2017], 11pgs (Year: 2017).*

"European Extended Search Report", European Patent Center, dated Dec. 12, 2022 (Dec. 12, 2022), for European Application No. 22186709.6-1203, 14pgs.

Khurana, Udayan et al., "Ensembles with Automated Feature Engineering", Jul. 15, 2018 (Jul. 15, 2018), XP055606400, Retrieved from the Internet: URL:https://udayankhurana.com/wp-content/uploads/2018/08/58.pdf, [retrieved on Jul. 17, 2019], 9pgs.

Khurana, Udayan et al., "Feature Engineering for Predictive Modeling using Reinforcement Learning". arX1V:1709.07150v1 [cs.A1], Cornell Universicity Library, Sep. 21, 2017 (Sep. 21, 2017), XP080822280, 8pgs.

Stadie, Bradly C et al., "Incentivizing Exploration In Reinforcement Learning With Deep Predictive Models", arXiv: 1507.00814v3, Nov. 19, 2015 (Nov. 19, 2015), XP055395591, Retrieved from the Internet: URL:https://arxiv.org/abs/1507.00814v3, [retrieved on Aug. 2, 2017], 11pgs.

* cited by examiner

AUTOMATED FEATURE ENGINEERING FOR PREDICTIVE MODELING USING DEEP REINFORCEMENT LEARNING

RELATED APPLICATIONS

This non-provisional patent application claims prior benefit, with regard to all common subject matter, of earlier-filed U.S. Provisional Patent Application No. 63/291,789 (the '789 Patent), filed Dec. 20, 2021, and entitled "AUTOMATED FEATURE ENGINEERING FOR PREDICTIVE MODELING USING DEEP REINFORCEMENT LEARNING." The identified '789 provisional patent application is hereby incorporated by reference in its entirety into the present application.

BACKGROUND

1. Field

Embodiments of the present teachings relate to feature engineering for predictive modeling. Specifically, embodiments of the present teaching relate to automated feature engineering utilizing deep reinforcement learning to improve predictive models.

2. Related Art

In predictive modeling, variables are input into a learned predictive model to predict the outcome of a system associated with the input variables. Typically, all variables are input into a predictive model even when not all the variables impact the outcome of the predictive model. In some cases, variables may be input into the model that are redundant and negatively affect the outcome of the model. Feature engineering may be used to narrow the field of input variables to a reduced set of features that has the highest impact on the predictive model outcome.

In typical feature engineering systems, various methods are utilized to generate a reduced set of input variables that achieve higher impact on the predictive model outcome. For example, expansion-reduction methods and evolution-centric methods can be used. These methods suffer from several drawbacks. Some models are based on heterogeneous transformation graphs with feature nodes and dataset nodes. These algorithms suffer an explosion problem as the number of features grows exponentially in a hierarchically structured graph, along with computational costs. Furthermore, a space of actions is limited to arithmetic functions which are raw functions and do not consider categorical features. Furthermore, some models utilize linear approximations on Q-learning which limits the ability of automatic feature engineering. Furthermore, differences between features are typically ignored such that transformation operators are applied to all features. Generally, current algorithms do not support combinatorial space, are not efficient, and do not support transformations. This results in highly expensive computations, especially for large data sets.

What is needed are systems, programs, and methods for feature engineering that improve predictive modeling by optimally selecting the features with the highest impact on the predictive model outcome and which reduces the dimension of the input to reduce processing of the predictive model.

SUMMARY

Embodiments of the disclosure solve the above-described problems by providing programs, systems, and methods for automatically performing feature engineering to generate reduced feature sets that include the features that most impact the outcome of predictive models. Deep reinforcement learning may be applied to select actions that maximize a cumulative reward based on a reward function.

An embodiment is directed to a method of performing feature engineering on a dataset for predictive modeling. The method comprises receiving a dataset, the dataset comprising a plurality of features, responsive to receiving the dataset, inputting the dataset into the neural network, receiving, from the neural network, a selection of an action to perform on at least one feature of the plurality of features, responsive to receiving the selection of the action, transforming the dataset by applying the action to the at least one feature to obtain a transformed dataset, calculating a reward for the neural network based on the action, determining if a budget for the neural network is reached, responsive to determining the budget is reached, storing the plurality of features in a final model, and responsive to determining the budget is not reached, inputting the transformed dataset and the reward into the neural network for further iterating.

In some aspects, the techniques described herein relate to one or more non-transitory computer-readable media storing computer-executable instructions that, when executed by a processor, perform a method of performing feature engineering on a dataset for predictive modeling, the method including: receiving the dataset, the dataset including a plurality of features; responsive to receiving the dataset, inputting the dataset into a neural network; receiving, from the neural network, a selection of an action to perform on at least one feature of the plurality of features; responsive to receiving the selection of the action, transforming the dataset by applying the action to the at least one feature to obtain a transformed dataset; calculating a reward for the neural network based on the action; determining if a budget for the neural network is reached; responsive to determining that the budget is reached, storing the plurality of features in a final model; and responsive to determining the budget is not reached, inputting the transformed dataset and the reward into the neural network for further iterating.

In some aspects, the techniques described herein relate to a media, wherein each feature of the plurality of features includes at least one characteristic selected from: an average immediate reward, a number of times a transformation has been used, a remaining budget, a number of numerical features, datetime features, or string features. In some embodiments, features can be of any type. Each feature may be represented by a vector comprising all characteristics including statistical characteristics to map the features in an input layer of the neural network. If the model generates a new feature by an arithmetic method, the newly calculated feature may be included in the input layer by the vector. This method may be applied to all non-categorical features of the actual dataset. For categorical features, one-hot encoding may be used. All generated vectors may be combined into one vector to be used as the input layer of the neural network in the next iteration.

In some aspects, the techniques described herein relate to a media, wherein the budget includes one of a time budget or a processing budget.

In some aspects, the techniques described herein relate to a media, wherein the neural network is configured to calculate an intermediate reward score for each of a plurality of actions applied to the at least one feature.

In some aspects, the techniques described herein relate to a media, wherein the selected action includes the action of the plurality of actions with a best intermediate reward score.

In some aspects, the techniques described herein relate to a media, wherein calculating the reward includes determining a difference between the reward and a previous reward from a previous neural network iteration.

In some aspects, the techniques described herein relate to a media, wherein the method further includes determining a feature of the plurality of features does not improve a predictive model; and responsive to determining the feature does not improve the predictive model, removing the feature from the dataset.

In some aspects, the techniques described herein relate to a method of performing feature engineering on a dataset for predictive modeling, the method including: receiving the dataset, the dataset including a plurality of features; responsive to receiving the dataset, inputting the dataset into a neural network; receiving, from the neural network, a selection of an action to perform on at least one feature of the plurality of features; responsive to receiving the selection of the action, transforming the dataset by applying the action to the at least one feature to obtain a transformed dataset; calculating a reward for the neural network based on the action; determining if a budget for the neural network is reached; responsive to determining the budget is reached, storing the plurality of features in a final model; and responsive to determining the budget is not reached, inputting the transformed dataset and the reward into the neural network for further iterating.

In some aspects, the techniques described herein relate to a method, wherein the method further includes determining a policy for the neural network, the policy defining a mapping of the action to the dataset.

In some aspects, the techniques described herein relate to a method, wherein the method further includes updating the policy responsive to calculating the reward.

In some aspects, the techniques described herein relate to a method, wherein the method further includes encoding the plurality of features using one-hot encoding.

In some aspects, the techniques described herein relate to a method, wherein the method further includes receiving an additional dataset; and training the neural network on the additional dataset.

In some aspects, the techniques described herein relate to a method, wherein training the neural network on the additional dataset includes applying an epsilon-greedy algorithm on the additional dataset; storing transactions into a replay buffer; and updating at least one parameter of the neural network using mini-batch gradient descent.

In some aspects, the techniques described herein relate to a method, wherein the method further includes determining, based on the reward, that a feature can be removed from the dataset; and responsive to determining that the feature can be removed, removing the feature from the dataset.

In some aspects, the techniques described herein relate to a system for performing feature engineering on a dataset for predictive modeling, the system including: a processor; a datastore; and one or more non-transitory computer-readable media storing computer-executable instructions that, when executed by the processor, perform a method of performing the feature engineering on the dataset for the predictive modeling, the method including: receiving the dataset, the dataset including a plurality of features; responsive to receiving the dataset, inputting the dataset into a neural network; receiving, from the neural network, a selection of an action to perform on at least one feature of the plurality of features; responsive to receiving the selection of the action, transforming the dataset by applying the action to the at least one feature to obtain a transformed dataset; calculating a reward for the neural network based on the action; determining if a budget for the neural network is reached; responsive to determining the budget is reached, storing the plurality of features in a final model; and responsive to determining the budget is not reached, inputting the transformed dataset and the reward into the neural network for further iterating.

In some aspects, the techniques described herein relate to a system, wherein the action includes an aggregation function.

In some aspects, the techniques described herein relate to a system, wherein a feature of the plurality of features includes at least one characteristic, wherein the at least one characteristic includes at least one statistical measure. The features may not contain a statistical measure. The statistical measures may be calculated for each feature when mapping the state into the neural network.

In some aspects, the techniques described herein relate to a system, wherein the selected action includes removing the at least one feature from the dataset.

In some aspects, the techniques described herein relate to a system, wherein the action is selected by a deep reinforcement learning agent associated with the neural network.

In some aspects, the techniques described herein relate to a system, wherein the neural network is configured to calculate an intermediate reward score for each of a plurality of actions applied to the at least one feature, and wherein the selected action includes the action of the plurality of actions with a best intermediate reward score.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1A:
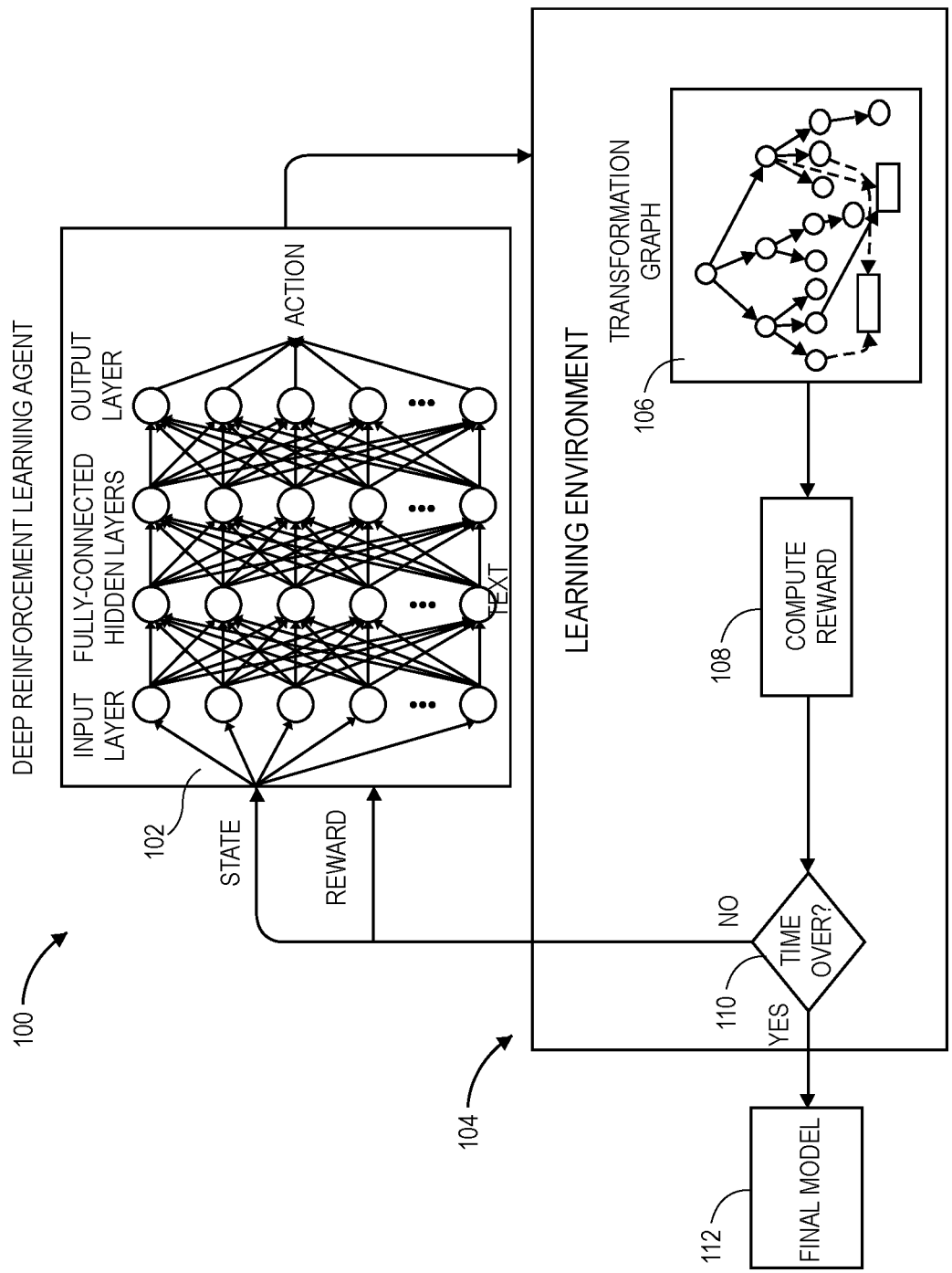
FIG. 1A depicts an exemplary system for automated feature engineering using deep reinforcement learning.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, predictive models comprise two phases; a training phase and an inference phase. The training phase, typically, utilizes known data and trains a model to predict the outcome of processes based on the known data. When there is no known data, other methods such as, for example, deep reinforcement learning may be implemented. Deep reinforcement learning may provide a reward for state transformations that improve the predictive model. A cumulative reward may be maximized thus providing a set of features that maximizes the improvement in predictive models. In some embodiments, the input states to the feature engineering system may be processed to determine features for input into the predictive models. Generating these features may reduce the total variables processed by the predictive model saving time and processing power during the inference phase of the predictive models. When the training phase is complete, the final model comprising the final features may be put into use processing new data.

Consider an exemplary embodiment of a predictive modeling problem consisting of a dataset, D, with features $F=\{f_1, \ldots, f_n\}$, a target vector, y, a set of transformations, $T=\{t_1, \ldots, t_k\}$, an applicable learning algorithm, L, (e.g., linear regression, etc.), and a measure of performance m (e.g., F1-score, etc.). Cross-validation performance of the predictive model on given data using measure of performance m with learning algorithm L may be defined as $P_L^m$ (F, y) (also referred to hereinafter simply as P(D)). The feature engineering problem may then be stated as finding a set of features, $F^*=F_1 \cup F_2$, where $F_1 \subseteq F$ and $F_2 \subseteq F_T$ in order to maximize the modeling accuracy for a given learning algorithm L and performance measure m, where F represents the original dataset, and $F_T$ represents the original dataset with transformations applied thereto. The feature engineering problem is illustrated in Eq. 1.

$$F^* = \underset{F_2}{\operatorname{argmax}} P_L^m(F_1 \cup F_2, y) \quad \text{(Eq. 1)}$$

Thus, for a dataset having n features and k unary transformations, $O(k \times n)$ new features may be constructed. If k binary transformations are applied, $O(k \times A_2^n)$ features are possible, where $A_2^n$ is the 2-permutation of n features. Thus, for a fixed set of transformations, for an exact solution, the number of new features and the combinations thereof grows exponentially. As such, enumeration and trial by training is computationally infeasible, and systems and methods for automating feature engineering are needed as discussed in embodiments herein.

FIG. 1A depicts an exemplary feature engineering system 100 using deep reinforcement learning to automate the process of feature engineering. A state of the system and a reward may be input into a deep reinforcement learning (DRL) agent. In some embodiments, feature engineering system 100 maximizes a cumulative reward. Maximizing the reward reveals those features that have the highest impact on the predictive outcome while reducing the total processing during the inference phase of the predictive model.

In some embodiments, a reinforcement learning agent (e.g., the DRL agent) may be described using the framework of Markovian Decision Process (MDP), which provides a mathematical framework for modeling decision making when outcomes are partially random and partially under the control of a decision maker (i.e., the DRL agent). The MDP framework may comprise a finite or infinite set of states, $S=\{s_i\}$; a finite or infinite set of actions, $A=\{a_j\}$; a state transition function T(s, a, s') specifying the next state s' given the current state s and action a; a reward function R(s, a, s') specifying the reward given to the reinforcement learning agent for choosing an action a in a state s and transitioning to a new state s'; and a policy $\pi:S \rightarrow A$ defining a mapping from states to actions. A state may correspond to a dataset provided to the DRL agent. As discussed in further detail below, the DRL agent may attempt to select actions by maximizing a cumulative reward, which is defined as:

$$Q^*(s, a) = \max_\pi \mathbb{E}\left[r_t + \gamma r_{t+1} + \gamma^2 r_{t+2} + \ldots \mid s_t = s, a_t = a, \pi\right] \quad \text{(Eq. 2)}$$

In Eq. 2, $Q^*$ represents the maximum sum of rewards $r_t$ discounted by factor $\gamma$ at each time step. The Q-function may be induced with the DRL agent using a multi-layer neural network 102 and may be parameterized as $Q(s, a; \theta_i)$, where $\theta_i$ are the parameters (i.e., weights) of the neural network at an iteration i. To induce the Q-function, Q-learning updates may be applied over mini-batches of experience $MB=\{(s, a, r, s') \sim U(D)\}$ drawn uniformly from dataset D. Thus, as seen in Eq. 3 below, a Q-learning update at an iteration, i, may be defined as the loss function of multilayer neural network 102:

$$L_i(\theta_i) = \mathbb{E}_{MB}\left[\left(r + \gamma \max_{a'} Q(s', a', \overline{\theta}_i) - Q(s, a; \theta_i)\right)^2\right] \quad \text{(Eq. 3)}$$

In Eq. 3, $\theta_i$ are the parameters of the multi-layer neural network 102 at iteration i, and $\overline{\theta}_i$ are the target parameters of multi-layer neural network 102 at iteration i.

In some embodiments, states, actions, and the reward function may be set by the user. The reward may be a function that rewards the algorithm based on an action that moves from a current input state to a new output state as described in the example above. In some embodiments, a reward may be calculated for each action and the cumulative reward may be maximized. In some embodiments, the reward function may be maximized over multi-layer neural network 102 as shown in FIG. 1A, and the reward may be provided based on a difference between the predictive model outcome from a first state and a second state after feature generation. The reward may be calculated and given for each action. The DRL agent may perform actions from a set of possible actions and an intermediate reward, calculated by the reward function, may be given to each action. As such, each action moving the input state, or an individual input variable or feature, to a new state has an associated calculated reward. Multi-layer neural network 102 may be implemented to calculate the action across the state transition from the current, or input, state to a new, or output, state. In some embodiments, the input layer into multi-layer neural network 102 may be any statistical measure of the features.

In some embodiments, the input layer of multi-layer neural network 102 may be the calculated characteristics of all features. The characteristics may include statistical measures of each feature and other factors that may affect exploration as described in embodiments above. For example, if we have 3 features in the datatset (A, B, C) and the model selects action "square", the new dataset may be (A, B, C, $A^2$, $B^2$, $C^2$). In this case the input layer may be (average immediate reward, number of times the function 'square' has been used, remaining budget, number of numerical features, datetime features and string feature of the new dataset, std(A), std(B), std(C), std($A^2$), std($B^2$), std($C^2$), Avg(A), Avg(B), Avg(C), Avg($A^2$), Avg($B^2$), Avg ($C^2$), skew . . . ).

In some embodiments, the state is mapped at the input layer of multi-layer neural network 102 with characteristics that define the structure and properties of the data set and as well as factors that influence the exploration choice at each step. Exemplary factors may comprise transformation's average immediate reward, a number of times a transformation has been used, a remaining budget, a number of numerical features, datetime features and string features, in addition to various statistical measures (e.g., standard deviation, skewness, mean, frequency, etc.). In exemplary embodiments, one-hot encoding may be used for encoding categorical features then all values may be normalized using Z-score techniques.

The rewards for each action of a plurality of actions on each variable of a plurality of input variables may be estimated. In some embodiments, the reward may be calculated using the reward function. After calculating the Q-values by multi-layer neural network 102, epsilon greedy algorithm may be applied to select either the best action that has the maximum reward or selecting a random action based on a certain probability given as an input. In some embodiments, the cumulative sum of the rewards may be maximized based on the state transition caused by the action.

Multi-layer neural network 102 may approximate the maximum cumulative reward prior to passing the determined action to learning environment 104. Transformation graph 106 may provide a transformation based on the received action as the output from multi-layer neural network 102. After the transformation from the previous state to the new state, the cumulative reward may be computed at compute reward component 108. The new state may then be moved to decision 110 where a budget is analyzed. In some embodiments, the budget may be any time budget, processing budget, or any other key performance indicators associated with the analysis. Based on the budget, the state may either output as the final feature model at final model 112 or be reintroduced to multi-layer neural network 102 as a new input state. The process may be iterated until the budget is reached.

In some embodiments, feature engineering may be performed on real-world datasets to determine features with the highest impact on improving predictive models on those datasets. Furthermore, the predictive models may be tested at each step to determine if the input features are improving the predictive model. The process may be iterative such that the output states are returned and processed successively to gain the best output state while removing variables that do not contribute to increase the performance of the predictive models as determined by the reward function. As such, low-performing variables and redundant variables may be removed to improve the predictive model while reducing processing time and power.

In some embodiments, cost versus improvement tradeoffs may be managed during feature engineering. Features may be generated that increase the predictive power of predictive models; however, if too many features are present, the predictive model, in the inference phase, may have many useable features but the processing time is not manageable. Therefore, the features may be reduced to reduce processing time providing for more efficient predictive modeling while still maintaining optimized predictive power. Feature engineering system 100 may provide optimized features such that a predictive model has a high predictive power while maintaining a manageable processing time.

In some embodiments, the feature engineering system 100 may be trained across a plurality of datasets such that the feature engineering system does not need to be trained on each new dataset. Training the feature engineering system across a plurality of datasets may provide robust features that may work to improve predictive models while reducing processing simultaneously across a plurality of use cases without retraining. Training the feature engineering system 100 across a plurality of datasets may comprise applying the epsilon-greedy algorithm on a dataset of the plurality of datasets, storing the transactions into a replay buffer, and using mini-batch gradient descent to update the parameters of multi-layer neural network 102. This process may be iterated until convergence is reached.

Figure 1B:
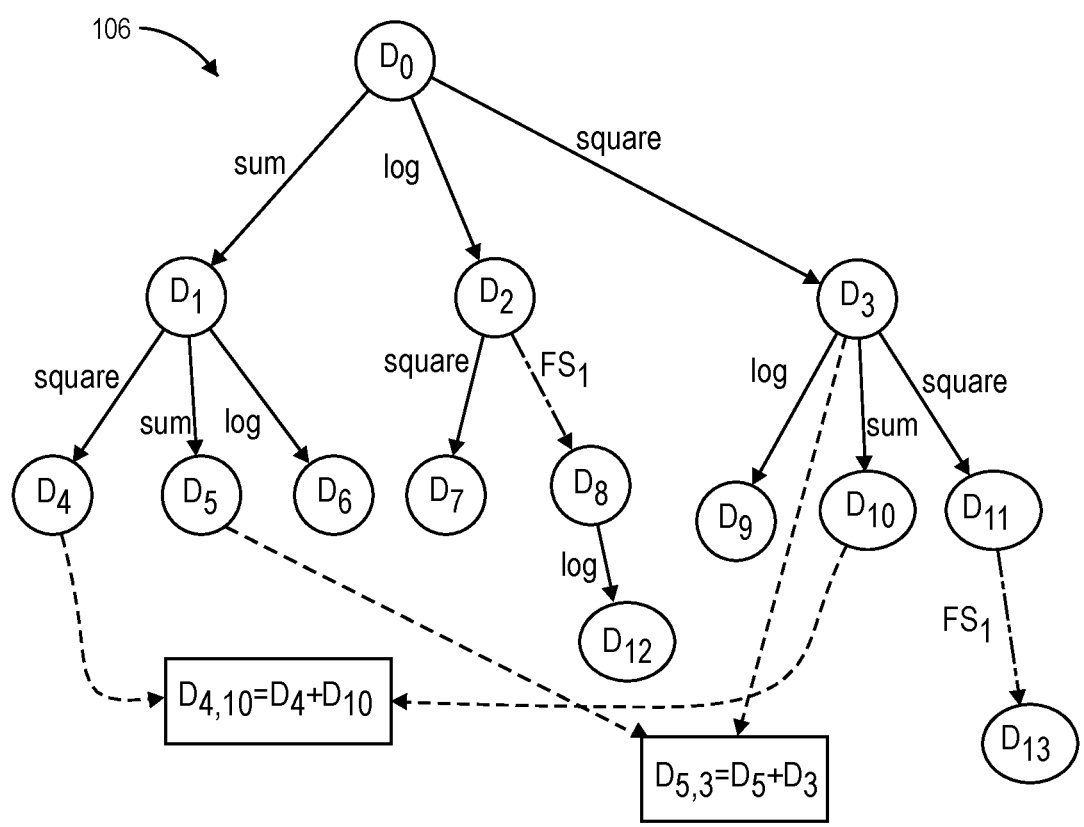
FIG. 1B depicts an exemplary transformation graph for automated feature engineering for some embodiments.

FIG. 1B depicts an example transformation graph 106 which will be useful in illustrating the operation of various embodiments described herein. Transformation graph 106 may be a direct acyclic graph (DAG). Transformation graph 106 may comprise batching, new feature generation, and evaluation. Batching may be performed per transformation such that, at each step, one transformation is applied to the dataset, thereby generating a set of new features. The batching process may be performed recursively to form the DAG.

For example, as illustrated in FIG. 1B, an initial transformation batch (i.e., sum, log, and square) is applied to root node dataset $D_0$, resulting in three new datasets, $D_1$, $D_2$, and $D_3$. Subsequently, datasets $D_1$, $D_2$, and $D_3$ are transformed to obtain datasets $D_4$-$D_{11}$ as shown. Similarly, datasets $D_8$ and $D_{11}$ each have a transformation applied thereto to obtain datasets $D_{12}$ and $D_{13}$. The direction of an edge of transformation graph 106 may represent the direction of the transformation. For example, the edge pointing from $D_1$ to $D_4$ indicates that dataset $D_4$ was formed by applying a square transformation to dataset $D_1$. Each child dataset $D_1$-$D_{13}$ may comprise the same target and row count as the root node dataset $D_0$. The sum may represent the union of two datasets $D_i$ and $D_j$ where i≠j.

At each step i of transformation graph 106, a state $s_i \in S$ may comprise transformation graph 106 after i node additions along with the remaining budget $$b = \frac{i}{B_{max}}.$$

Thus, for example, transformation graph 106 at step 5 comprises nodes $D_0$-$D_5$ and the remaining budget $$b = \frac{5}{B_{max}}.$$

action $a_i \in A$ at step i may be one of an action for feature generation which applies a transformation $t \in T$ on one or more features $\{f\}$ to derive new features, or an action for feature selection by reinforcement learning, which may drop one or more features $\{f\}$ from dataset $D_i=(F_i, y)$. Further, the policy $\pi : S \rightarrow A$ may determine which action is taken given a state, such that the reward, $r_i$, of this feature engineering problem in transformation graph 106 at step i is:

$$r_t = \max_{j \in [0, i+1]} P_L^m(D_j) - \max_{k \in [0, i]} P_L^m(D_k) \quad \text{(Eq. 4)}$$

Figure 2:
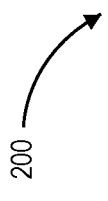
FIG. 2 depicts an exemplary use case with comparisons of embodiments of automated feature engineering.

FIG. 2 depicts an exemplary output and comparison of a use case of utilizing the feature engineering output model to improve a predictive model and may be generally referenced with reference numeral 200. Here, the exemplary predictive model was used with and without the feature engineering model to predict positive and negative reviews for AMAZON products. The exemplary dataset comprises client reviews as well as information about the clients such as, for example, demographic information. The problem here was to predict the classification of the review as positive or negative. Positive and negative predictions were compared to stars of the review to determine the predictive quality.

In this exemplary embodiment, the predictive quality for each iteration as predicted by the predictive model is known. The reward may be applied to each feature based on the predictive outcome and how the predictive outcome changes for each iteration. As such, the features that provide the best predictive outcome can be assigned the highest reward. When the cumulative reward is maximized, the best features are used as either inputs into the next iteration or as the final model if the final iteration is performed. In some embodiments, the reward may be binary such as, for example, positive if the feature improves the prediction and negative if the feature does not improve the prediction.

In the exemplary use case depicted in FIG. 2, the table comprises the data source, a type of problem (e.g., "C" classification or "R" regression), rows, a number of features with feature engineering, a number of features without feature generation, and a number of features after feature selection. As can be seen, the number of features without feature engineering is significantly higher than the number of features after feature engineering. This reduces processing time and improves efficiency of the predictive model.

Furthermore, the predictive model is shown to have improved predictions using the feature engineering model. The results are also shown in FIG. 2. The Base field shows a measure of the predictive results of the test without feature engineering and the DRL shows a measure of the predictive results with predictive engineering. Expansion-reduction shows predictive power for typical methods currently used that generate large amounts of features. Feature selection may be applied to expansion-reduction techniques; however, the time cost and processing cost associated with this process is significant. The Random field shows the result of applying a random method of transformation to generate new datasets, and the Featuretools field shows the results of applying the Featuretools software tool for feature engineering. As can be seen, the predictive model with DRL provided much greater predictive power over all other predictive models tested while also reducing the number of features. As such, the inference phase cost associated with the DRL feature engineering model may be reduced while improving the predictive power of the predictive model.

Figure 3:
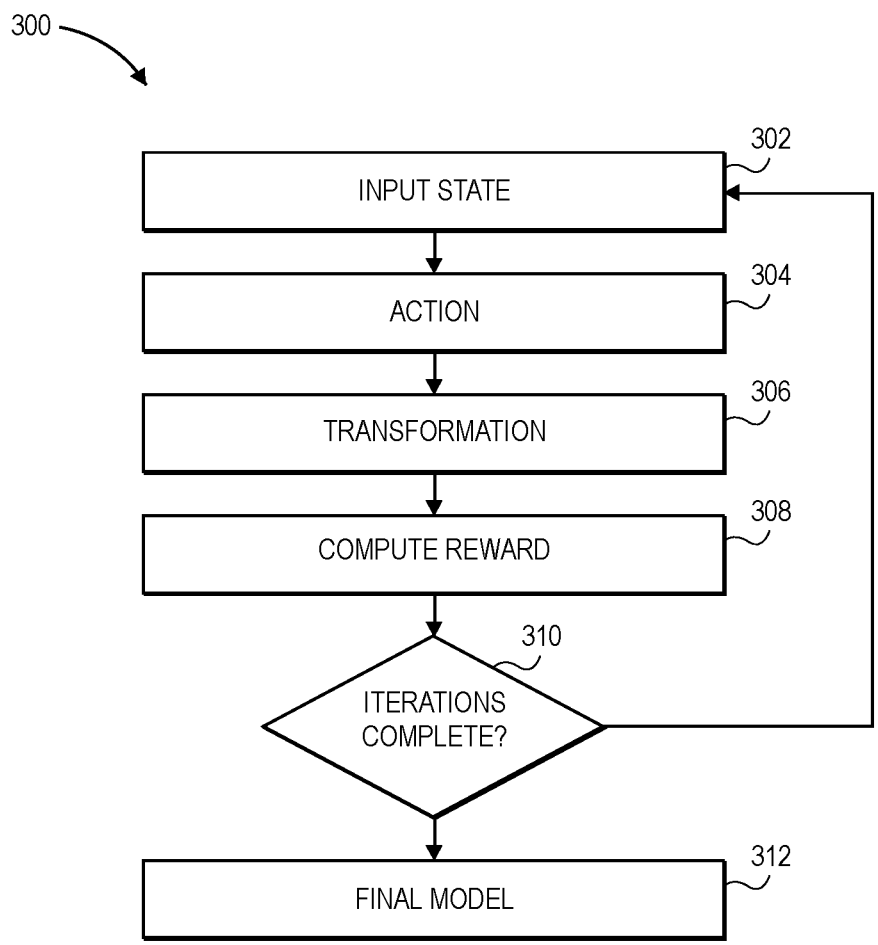
FIG. 3 depicts an exemplary process of automated feature engineering using deep reinforcement learning.

FIG. 3 depicts an exemplary method of automated FE for a predictive model to increase predictive power of the predictive model while reducing processing costs associated with the predictive model generally referenced by the numeral 300. At step 302, the state is input into multi-layer neural network 102 as described in embodiments above. The state may comprise characteristics of the features such that multi-layer neural network 102 may utilize the characteristics for processing. The input state may be an output state of feature engineering system 100 processing on a successive iteration.

At step 304, an action may be selected. Actions may be selected for each feature such that the action may be performed to either result in feature generation that positively or negatively impacts the predictive model or, in some cases, do not affect the predictions. Some actions generate features that do not improve the predictive model. In some embodiments, the actions may not be limited to basic operators and arithmetic functions. Actions may also leverage aggregation functions to compute aggregated values over a context which, in some embodiments, may be time-based (e.g., sum(revenue) for time=today as compared to sum(revenue) for time=yesterday). The ratios may then be computed. In another exemplary embodiment, transformation combined with aggregations is a pivot (e.g., sum (revenue) for time=yesterday, category=smartphone). Pivoting may be necessary or desirable for low-cardinality categorical variables. The features that do not improve the predictive model may be removed from the state for further processing or from the final model.

At step 306, the actions may be implemented for transformation of the state from the current state to the next state as described in embodiments above. In some embodiments, a transformation may force the feature selection. The overall number of generated features may be reduced based on performance as described above. Exemplary transformations may include arithmetic and basic functions applied on numerical data, temporal aggregation functions to compute aggregation values over a time context, one-hot encoding for categorical features, and feature selection which may be considered as a transformation to overcome the combinatorial space (reduced dimension).

At step 308, the reward is computed to determine if the state transition with the new feature generation has improved the prediction of the predictive model. The reward may be applied to each feature based on the predictive outcome and how the predictive outcome changes for each iteration. As such, the features that provide the best predictive outcome can be assigned the highest reward. When the cumulative reward is maximized, the best features are used as either inputs into the next iteration or as the final model if the final iteration is performed.

At step 310, the budget is analyzed as described in embodiments above. If there are more iterations to be performed, the current state is fed back into multi-layer neural network 102. If the budget is reached then the iterations are complete, and the generated features are stored as the final model at step 312.

Figure 4:
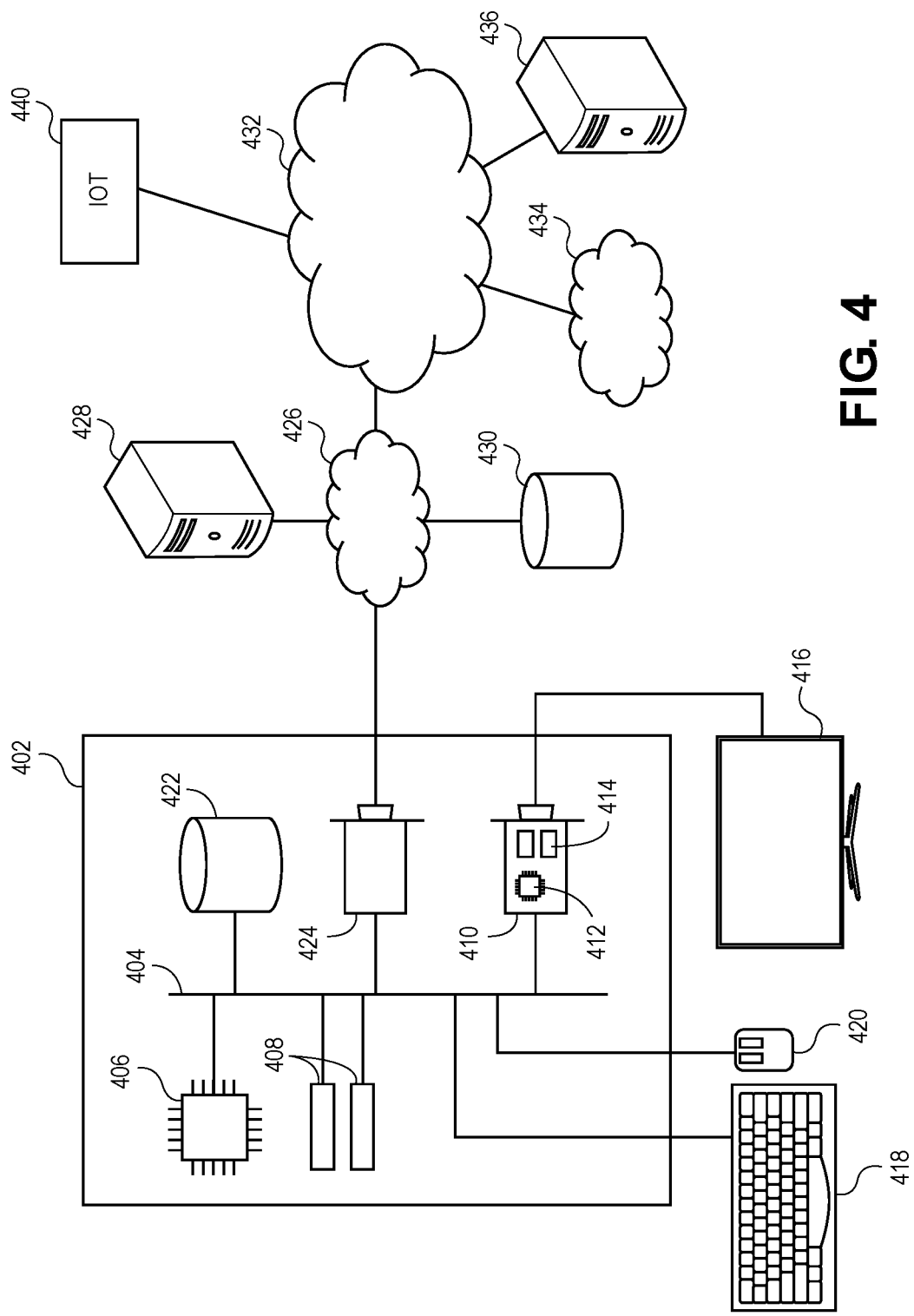
FIG. 4 depicts an exemplary embodiment of a hardware platform for use with embodiments of the present disclosure.

Turning to FIG. 4, an exemplary hardware platform that can form one element of certain embodiments of the disclosure is depicted. Computer 402 can be a desktop computer, a laptop computer, a server computer, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple buses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media and may be internally installed in computer 402 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 424 is also attached to system bus 404 and allows computer 402 to communicate over a network such as local network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 432. Local network 426 is in turn connected to Internet 432, which connects many networks such as local network 426, remote network 434 or directly attached computers such as computer 436. In some embodiments, computer 402 can itself be directly connected to Internet 432. In some embodiments, Internet 432 connects to one or more Internet of Things (IoT) devices 440.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. One or more non-transitory computer-readable media storing computer-executable instructions that, when executed by a processor, perform a method comprising:
   receiving a dataset comprising a plurality of features, each of the plurality of features associated with a plurality of values;
   responsive to receiving the dataset, and for each of the plurality of features, determining a statistical measure from the plurality of values associated with the feature;
   inputting the statistical measures into a neural network;
   receiving, from the neural network, an action;
   responsive to receiving the selection of the action, transforming the dataset by applying the action to at least one of the plurality of features to obtain a transformed dataset including a second plurality of features;
   calculating a reward for the neural network based on the action;
   determining if a budget for the neural network is reached;
   responsive to determining that the budget is reached, storing the second plurality of features in a final model; and
   responsive to determining the budget is not reached, determining a second statistical measure of each of the second plurality of features from the second plurality of values associated with each of the second plurality of features and inputting the second statistical measures and the reward into the neural network.

2. The media of claim 1, wherein the budget comprises one of a time budget or a processing budget.

3. The media of claim 1, wherein the reward is calculated by a difference between a performance of a predictive model including the second plurality of features and a performance of a predictive model including the plurality of features.

4. The media of claim 1,
   wherein the action is one of a plurality of actions, and
   wherein the action is associated with a best intermediate reward score of the plurality of actions or is a random action based on a probability.

5. The media of claim 1, wherein calculating the reward comprises determining a difference between the reward and a previous reward from a previous neural network iteration.

6. The media of claim 1, wherein the method further comprises:
   determining a feature of the plurality of features does not improve a predictive model; and responsive to determining the feature does not improve the predictive model, removing the feature from the dataset.

7. A method comprising:
receiving a dataset comprising a plurality of features, each of the plurality of features associated with a plurality of values;
responsive to receiving the dataset, and for each of the plurality of features, determining a statistical measure from the plurality of values associated with the feature;
inputting the statistical measures into a neural network;
receiving, from the neural network, a selection of an action;
responsive to receiving the selection of the action, transforming the dataset by applying the action to at least one of the plurality of features to obtain a transformed dataset including a second plurality of features;
calculating a reward for the neural network based on the action;
determining if a budget for the neural network is reached;
responsive to determining the budget is reached, storing the plurality of features in a final model; and
responsive to determining the budget is not reached, determining a second statistical measure of each of the second plurality of features from the second plurality of values associated with each of the second plurality of features and inputting the second statistical measures and the reward into the neural network.

8. The method of claim 7, further comprising determining a policy for the neural network, the policy defining a mapping of the action to the dataset.

9. The method of claim 7, further comprising updating the policy responsive to calculating the reward.

10. The method of claim 7, further comprising transforming categorical features into numerical features by one-hot encoding prior to determining the statistical measures.

11. The method of claim 7, further comprising:
receiving an additional dataset; and
training the neural network on the additional dataset.

12. The method of claim 11, wherein training the neural network on the additional dataset comprises:
applying an epsilon-greedy algorithm on the additional dataset;
storing transactions into a replay buffer; and
updating at least one parameter of the neural network using mini-batch gradient descent.

13. The method of claim 7, further comprising:
determining, based on the reward, that a feature can be removed from the dataset; and
responsive to determining that the feature can be removed, removing the feature from the dataset.

14. A system for performing feature engineering on a dataset for predictive modeling, the system comprising:
a processor;
and
one or more non-transitory computer-readable media storing computer-executable instructions that, when executed by the processor, perform a method comprising:
receiving a dataset comprising a plurality of features, each of the plurality of features associated with a plurality of values;
responsive to receiving the dataset, and for each of the plurality of features, determining a statistical measure from the plurality of values associated with the feature;
inputting the statistical measures into a neural network;
receiving, from the neural network, a selection of an action;
responsive to receiving the selection of the action, transforming the dataset by applying the action to at least one of the plurality of features to obtain a transformed dataset including a second plurality of features;
calculating a reward for the neural network based on the action;
determining if a budget for the neural network is reached;
responsive to determining the budget is reached, storing the plurality of features in a final model; and
responsive to determining the budget is not reached, determining a second statistical measure of each of the second plurality of features from the second plurality of values associated with each of the second plurality of features and inputting the second statistical measures and the reward into the neural network.

15. The system of claim 14, wherein the action comprises an aggregation function.

16. The system of claim 14, wherein the selected action comprises removing the at least one feature from the dataset.

17. The system of claim 14, wherein the action is selected by a deep reinforcement learning agent associated with the neural network.

18. The system of claim 14,
wherein the neural network is configured to calculate an intermediate reward score for each of a plurality of actions applied to the at least one feature, and
wherein the selected action comprises the action of the plurality of actions associated with a best intermediate reward score.

* * * * *